United States Patent
Harada et al.

(10) Patent No.: US 7,272,894 B2
(45) Date of Patent: Sep. 25, 2007

(54) DRUM DRYER

(75) Inventors: Shundo Harada, Kawasaki (JP); Shigehira Uda, Kawasaki (JP); Hideshi Matoba, Kawasaki (JP)

(73) Assignee: Ajinomoto Co., Inc., Tokyo (JP)

( * ) Notice: Subject to any disclaimer, the term of this patent is extended or adjusted under 35 U.S.C. 154(b) by 9 days.

(21) Appl. No.: 10/526,932

(22) PCT Filed: Nov. 25, 2003

(86) PCT No.: PCT/JP03/15050

§ 371 (c)(1),
(2), (4) Date: Mar. 8, 2005

(87) PCT Pub. No.: WO2004/047943

PCT Pub. Date: Jun. 10, 2004

(65) Prior Publication Data

US 2006/0123653 A1    Jun. 15, 2006

(30) Foreign Application Priority Data

Nov. 28, 2002   (JP)   ............................ 2002-345286

(51) Int. Cl.
    *F26B 19/00*   (2006.01)
(52) U.S. Cl. .................. 34/62; 34/85; 426/441; 62/601
(58) Field of Classification Search .......... 34/454, 34/92, 62, 112, 122, 85; 62/601; 426/441
    See application file for complete search history.

(56) References Cited

U.S. PATENT DOCUMENTS

| | | | | |
|---|---|---|---|---|
| 2,087,788 A | * | 7/1937 | Thal | ............................ 159/49 |
| 3,203,109 A | * | 8/1965 | Moore | ............................ 34/62 |
| 3,913,346 A | * | 10/1975 | Moody et al. | ................ 62/197 |
| 4,022,600 A | * | 5/1977 | Mutoh et al. | ................. 62/381 |
| 4,115,529 A | * | 9/1978 | Behling | ...................... 423/472 |
| 4,245,483 A | * | 1/1981 | Murai | .......................... 62/376 |
| 4,515,540 A | * | 5/1985 | Pillis | ........................... 418/97 |
| 4,741,868 A | * | 5/1988 | Rooney et al. | ................ 562/33 |
| 4,983,106 A | * | 1/1991 | Wright et al. | .................. 418/2 |
| 5,827,611 A | * | 10/1998 | Forbes | ........................ 428/375 |
| 5,996,242 A | * | 12/1999 | Matsumoto et al. | ........... 34/76 |
| 6,003,332 A | * | 12/1999 | Foster | ........................... 62/601 |
| 6,314,659 B1 | * | 11/2001 | Parker | ........................ 34/414 |
| 6,490,872 B1 | * | 12/2002 | Beck et al. | .................... 62/66 |

FOREIGN PATENT DOCUMENTS

| | | |
|---|---|---|
| JP | 70701/1990 | 5/1990 |
| JP | 7-8701 | 1/1995 |
| JP | 2002-54878 | 4/2002 |
| JP | 2004-25081 | 1/2004 |

\* cited by examiner

*Primary Examiner*—S. Gravini
(74) *Attorney, Agent, or Firm*—Oblon, Spivak, McClelland, Maier & Neustadt, P.C.

(57) ABSTRACT

A drum dryer provided with a liquid splash and scatter preventing equipment, which enables continuous operation by preventing a scattering liquid from making dry powder in the case in which the equipment is provided above a neighborhood of a liquid concentration section. A double drum type drum dryer including a liquid splash and scatter preventing equipment is provided in a horizontal above a neighborhood of a liquid concentration section between drums and has a cooling function.

17 Claims, 3 Drawing Sheets

[Fig. 1]
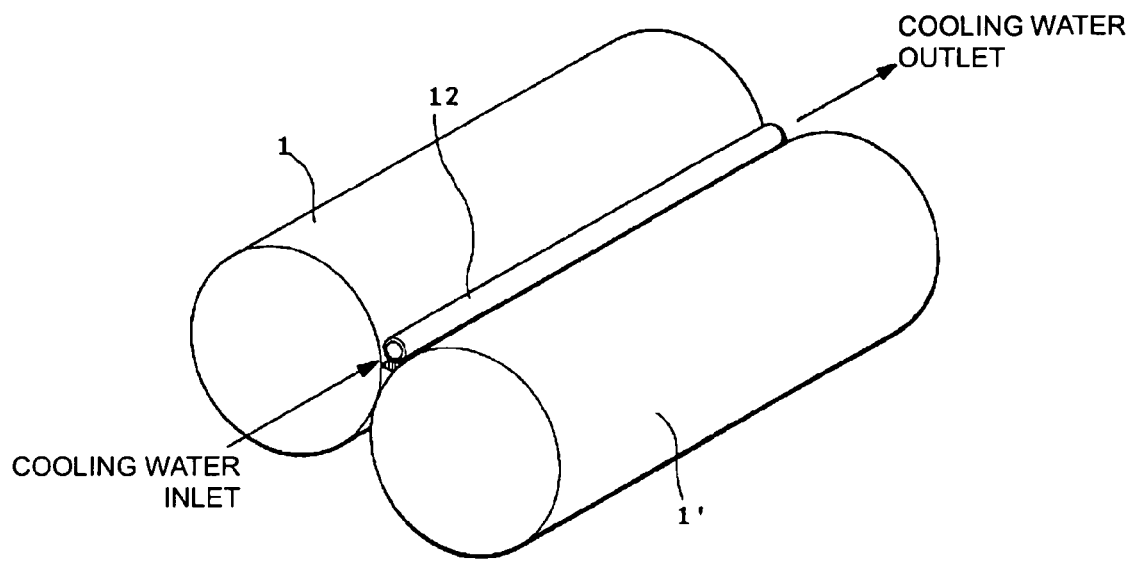
[Fig. 2]
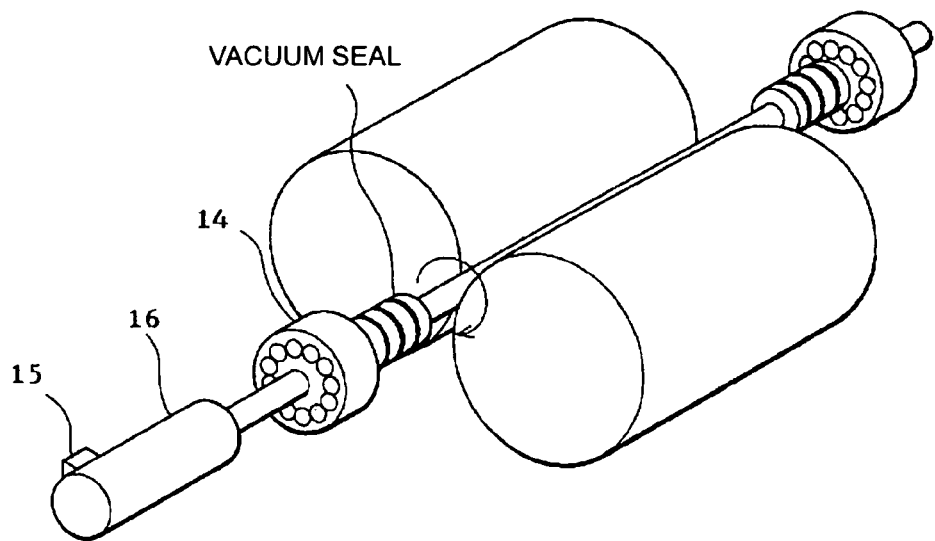

[Fig. 4]
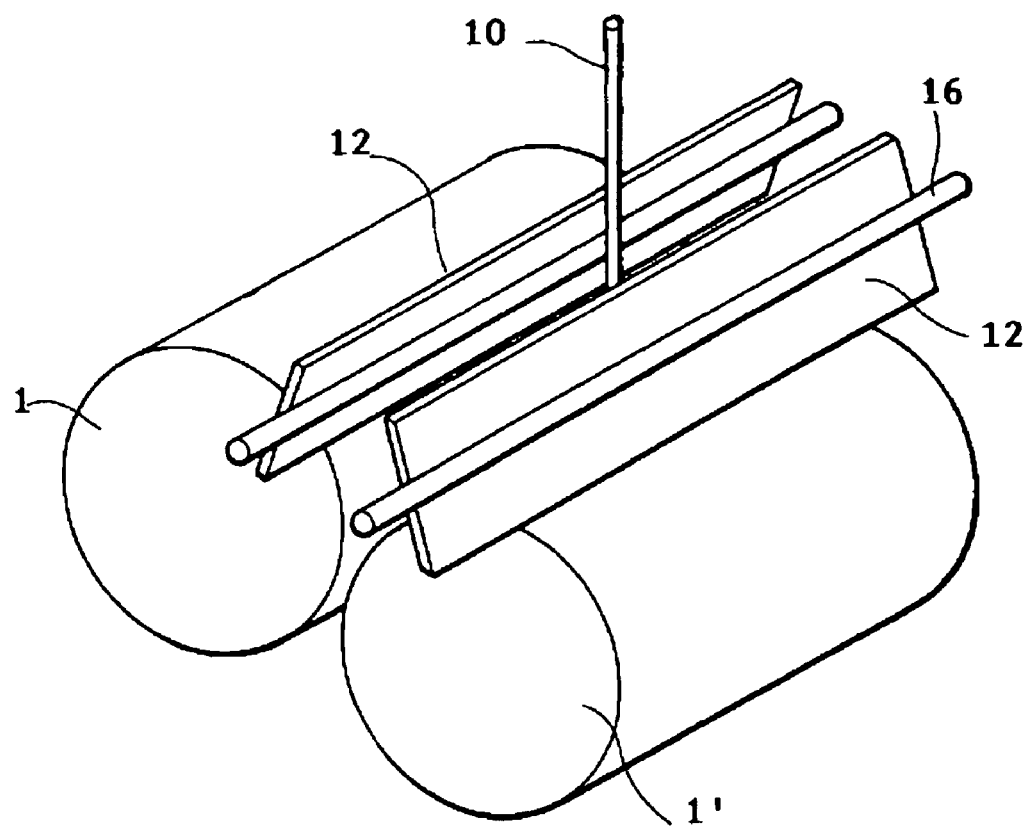

DRUM DRYER

FIELD OF THE INVENTION

The present invention relates to a double drum type drum dryer comprising a liquid splash and scatter preventing equipment, which is effective in preventing troubles caused by liquid splash and scatter generated due to bump in a liquid concentration section between drums.

DESCRIPTION OF THE RELATED ART

In the case where a liquid stock (substance being dried) is subjected to drying processing in a double drum type vacuum drum dryer or drum dryer, a vacuum chamber is maintained vacuum by a vacuum mechanism in the case of a vacuum drum dryer and drums are heated for drying. Also, with a drum dryer, drums are heated for drying at atmospheric pressure. In the both cases, a liquid stock is supplied to a liquid concentration section between double drums from a stock supply mechanism to be concentrated in the liquid concentration section, and then is caused to adhere to surfaces of the drums to be dried by heat from the drums, and a dry substance is scraped off by a scraper.

A typical example of conventional drum dryers will be described below on the basis of a vacuum drum dryer shown in FIG. 3. FIG. 3a is a longitudinal, cross sectional view perpendicular to an axial (lengthwise) direction of a drum rotating shaft, and FIG. 3b is a substantially longitudinal, cross sectional view in the axial direction of the drum rotating shaft.

As shown in the figure, the drum dryer comprises a vacuum chamber 15, in which a stationary drum 1 and a slide drum 1' are arranged in parallel to each other. Also, shafts 16 are supported above the drums 1, 1', and scraper knives (scraping blades) 2 are mounted to the shafts 16.

Guide plates 3 are supported through brackets on the shafts 16. Paddle conveyors 4 are fixed vertically below distal ends of the guide plates 3 to be in parallel to the drum shafts, and a paddle conveyor 5 is fixed below distal ends of the paddle conveyors in a running direction thereof to be perpendicular to the drum shafts. Further, a double damper receiver 8 is installed below both distal ends of the paddle conveyor 5 to comprise butterfly valves 6 and butterfly valves 7, which are arranged vertically. The double damper receiver 8 has a conical shape and agitators 9 are mounted therein from above for forcedly discharging a dry substance in the receiver.

When a processing of drying a liquid stock is performed in the drum dryer, an interior of the chamber 15 is first held in a vacuum state by a vacuum mechanism (not shown), and then the drums 1, 1' are heated and rotated. Subsequently, a liquid stock is supplied to a liquid concentration section 11 between the double drums from a stock supply mechanism (feed nozzle) 10, and a liquid stock is caused to temporarily stay and concentrate. The liquid stock is passed through a minimum clearance between the double drums to adhere to surfaces of the drums, and dried by heat from the drums, and a resulted dry substance is scraped off by the scraper knives 2.

At this time, there occurs a phenomenon that the liquid stock staying in the liquid concentration section 11 between the double drums according to liquid properties to splash and scatter a liquid, thus causing troubles, in which the liquid stock adheres to wall surfaces of the chamber 15 to lead to a decrease in yield, an attached substance grows to become large lumps, thus falling not only to constitute a hindrance, such as an obstacle to rotation of the drums, scarring of drum surfaces, or the like, to operation but also to mix in a product to cause degradation in quality of powder product.

A conventional scatter preventing mechanism in double-drum type drum driers comprises two metallic scatter preventing plates fixed above drums 1, 1' from above a concentration section between the double drums to be inclined in a manner to widen downward as shown in FIG. 4. The scatter preventing plates are mounted to shafts supported at both ends thereof to a vacuum chamber. In use, this mechanism serves to prevent scattering to wall surfaces of the chamber, but causes the same troubles as those described above since a bumping and scattering phenomenon occurs in the liquid concentration section to cause an attached substance adhering to the scatter preventing plates to fall. When such scatter preventing plates are applied to a large-sized drum drier, there has become clear a problem that cleaning is difficult since the scatter preventing plates are heavy and cannot be removed with ease.

The applicant of the present application has found that the above-mentioned problem is solved by providing a bumping scatter preventing sheet, which is provided with an easily removable mechanism, horizontally in a liquid concentration section between drums, or on a surface layer thereof, unlike the conventional system, in which two metallic scatter preventing plates are fixed above respective double drums to be inclined in a manner to widen downward, and has filed a patent application (see Japanese Patent Application No. 2002-187286). In the case where such bumping scatter preventing sheet is provided on a surface layer, which is separated from a liquid level of a liquid concentration section between drums and brought into no contact with a boiling liquid at all times, a lower portion of the sheet is put in a wet state due to liquid splash to be little susceptible of attachment of dry powder while a neighborhood of an upper portion of the sheet is exposed to a relatively high temperature (40 to 50° C.) by radiant heat from the drums when the drums are at, for example, 95° C. It has become clear that problems being improved are present for the reasons that under these circumstance a part of a liquid having boiled below the sheet scatters and rises through gaps between the drums and both ends of the sheet depending upon the rotational speed of the drums, liquid properties of a stock, or the like to fall onto, adhere to, and dry on an upper portion of the sheet to become powder to grow, and when a liquid stock supplied from a stock supply mechanism (feed nozzle) 10 strikes against a drum in rotation, a part of the liquid stock scatters and rises to similarly fall onto, adhere to, and dry on an upper portion of the sheet to become powder and the powder accumulates in large amount to involve a risk that the sheet is caught in the drum dryer to fall, and that since it is difficult to clean and remove sediment while the sheet remains mounted, there is a need of removing and cleaning the sheet whenever sediment generates, which constitutes a hindrance to continuous and stable operation over a long term.

SUMMARY OF THE INVENTION

In view of the above actual situation, the invention has its object to provide a drum dryer provided with a liquid splash and scatter preventing equipment, which is different in configuration and mechanism from the bumping scatter preventing sheet and prevents a scattering liquid from making dry powder whereby continuous operation is made possible.

Having earnestly done examination in order to solve the above problems, the inventors of the present application have completed the present invention finding that by providing a liquid splash and scatter preventing equipment, which is given a cooling function, above a neighborhood of a liquid concentration section, an increase in temperature of the liquid splash and scatter preventing equipment is suppressed even in an atmosphere exposed to high temperature in operation of drums with the result that when a scattering liquid adheres to an upper surface of the equipment, it remains in a liquid state whereby a continuous and stable operation is made possible over a long term and the equipment can be cleaned, as it is mounted, after termination of drum operation.

That is, the first invention provides a double drum type drum dryer comprising a liquid splash and scatter preventing equipment having a cooling function provided in a horizontal above a neighborhood of a liquid concentration section between drums.

According to the second invention, the liquid splash and scatter preventing equipment having the cooling function comprises therein a cavity for feeding of a cooling liquid refrigerant.

According to the third invention, the liquid splash and scatter preventing equipment having the cooling function is made of a hollow metal for feeding of cooling water.

BRIEF DESCRIPTION OF THE DRAWINGS

FIG. 1 is a schematic view showing an embodiment according to the invention.

FIG. 2 is a schematic view showing a rotary type liquid splash and scatter preventing equipment according to the invention.

FIG. 4 is a schematic view showing a conventional splash preventing equipment.

PREFERRED EMBODIMENTS OF THE INVENTION

Figure 3A:
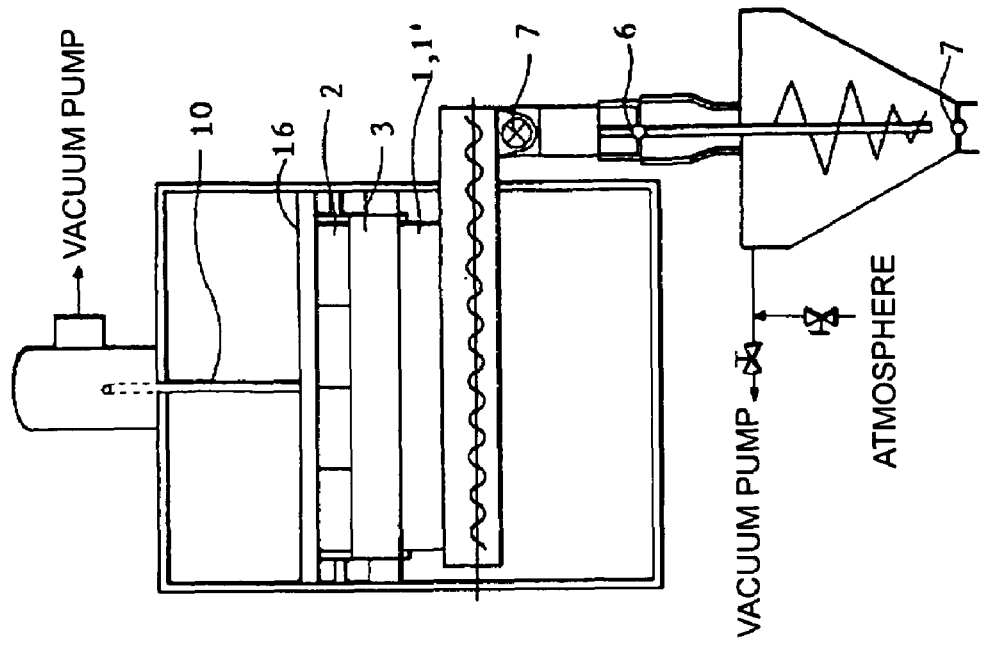
FIG. 3(a) is a substantially longitudinal cross sectional view perpendicular to an axial (lengthwise) direction of a drum rotating shaft of a body of a conventional drum dryer.
Figure 3B:
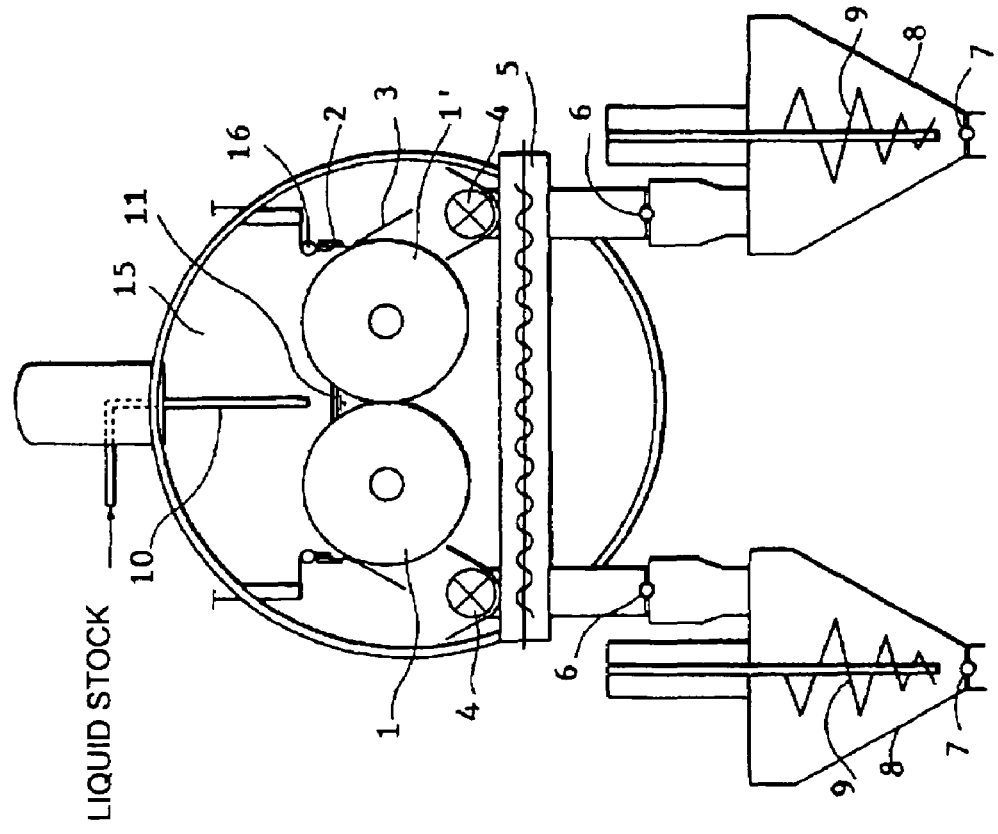
FIG. 3(b) is a substantially longitudinal, cross sectional view in the axial direction of the drum rotating shaft.

The invention will be described below by way of an embodiment shown in the drawings.

As shown in FIG. 1, a liquid splash and scatter preventing equipment made of a stainless steel pipe having an outside diameter of 27.2 mm and an inside diameter of 23 mm is provided horizontally at a level of 67 mm above a minimum clearance between double drums in a vacuum chamber. The metallic pipe is fixed through flanges to the vacuum chamber, and a cooling water is circulated through the hollow metal from outside so that the metallic pipe in a whole area between the drums is controlled at a temperature, at which a scattered liquid adhering to an upper portion of the metallic pipe does not dry to become powder, in operation of the drums.

A preferable temperature range can be readily set in a trial test with respect to a liquid stock being used. An extract of a chicken (evaporating temperature 18° C. in a concentration section between drums) was fed at a rate of 3 L/hr and dried under the conditions of, for example, drum diameter of 300 mm, drum temperature of 100° C., drum rotational speed of 2 rpm, and degree of vacuum of 2 kPa. At this time, observation was made with respect to a difference in a state of scatter between presence and absence of the liquid splash and scatter preventing metallic pipe, and the metallic pipe surface temperatures and a state of adherence to the metallic pipe when cooling water flowing through the metallic pipe was varied in temperature and surface temperature of the metallic pipe was measured with the use of a thermocouple. Also, TABLE 1 (liquid splash and scatter preventive results) indicates results with respect to a reference example in the case where the test was carried out without flowing of cooling water and with only the metallic pipe, and a comparative example in the case where no liquid splash and scatter preventing equipment was installed.

A difference in a state of liquid splash and scatter between presence and absence of the liquid splash and scatter preventing metallic pipe was conspicuous such that in the case where no liquid splash and scatter preventing equipment was installed (comparative example), adherence began at a looking glass installed on the side of the vacuum chamber with the start of operation and became to make observation of an interior of the vacuum chamber impossible within 5 hours since the start of operation. Meanwhile, in the case where the liquid splash and scatter preventing metallic pipe was installed, no adherence due to liquid splash and scatter was found, and the interior of the vacuum chamber could be clearly observed through the looking glass even 24 hours later.

In the case where cooling water was caused to flow through the liquid splash and scatter preventing metallic pipe to control surface temperature of the metallic pipe to 13° C. or lower (lower at least 5° C. than evaporating temperature), a phenomenon, in which an evaporated vapor condensed at the metallic pipe surface and fell, was observed, and degradation in dry capacity was noticed. Also, in the case where the metallic pipe was at 40° C. or higher (higher at least 22° C. than evaporating temperature) and was simply installed without flowing of cooling water [the metallic pipe surface reached 60° C. (higher 42° C. than evaporating temperature)], adherence and growth of powder at the pipe surface were noticed and there was a fear that an attached substance fell in operation over a long term to cause a trouble. In the case where the metallic pipe surface was controlled within 0 to 20° C. relative to the evaporating temperature, a liquid having splashed and scattered struck against the metallic pipe surface and then flowed down in a liquid state, and no attached substance was noticed even after 24 hour operation.

TABLE 1

Effect of liquid splash and scatter preventing equipment and influences on adherence depending upon presence and absence of circulation of cooling water

| Presence and absence of liquid splash and scatter preventing equipment | Presence and absence of circulation of cooling water | Cooling condition and surface temperature of liquid splash and scatter preventing equipment | | State of adherence after 24 hour operation | |
|---|---|---|---|---|---|
| | | Surface temperature of metallic pipe | Difference between surface temperature of metallic pipe and evaporating temperature of concentration section between drums | Metallic pipe surface | Vacuum drum dryer looking glass |
| Presence | Presence | 13° C. or lower | −5° C. or lower | Evaporated vapor condensed at metallic pipe surface and flowed down, and degradation in dry capacity was observed | There was no adherence and interior could be observed |
| | | 18-38° C. | 0-20° C. | Liquid having splashed and scattered to adhere to hollow metallic bar flowed down and there were no adherence and growth at metallic surface | |
| | | 40° C. or higher | 22° C. or higher | Liquid having splashed and scattered adhered to metallic surface to dry, and grew as dry powder | |
| | Absence (reference example) | 60° C. | 42° C. | | |
| Absence (comparative example) | — | — | — | — | Adherence due to liquid splash and scatter grew and interior could not be observed after operation of 5 hours |

The larger the liquid splash and scatter preventing equipment within a size to eliminate contact with the drum surfaces, the more efficiently a splashing and scattering liquid strikes against the equipment, so that an effect of splash and scatter prevention is improved.

Whatever shape and material of the liquid splash and scatter preventing equipment may be, a shape, such as cylindrical, semicylindrical, or trigonal prismatic shape, being smooth, convexly curved at at least an upper surface thereof, or being inclined to form a mountain shape having an apex and having therein a cavity for feeding of a cooling liquid medium, that is, being of a hollow structure is preferable since with such equipment provided on a front surface of a concentration section, a liquid having adhered to an upper portion of the equipment in operation of the drums does not accumulate and is easy to fall, and can be evenly cleaned wholly in a set position after termination of operation. Whatever material, such as metallic, non-metallic (wood, synthetic resin, or the like), makes the liquid splash and scatter preventing equipment, metal is preferable in terms of strength and thermal conductivity.

FIG. 2 shows an example of a rotary type liquid splash and scatter preventing equipment (cylindrical). The liquid splash and scatter preventing equipment is installed in parallel to and between drums, and has both ends thereof extending through a vacuum chamber and vacuum-sealed from outside, the both ends being fixed through bearings 14 for rotation by means of a motor provided with an inverter 15, and a speed reducer 16. In this case, when a shaft is rotated, measurement is continuously made on torque of the shaft, motor current, rotational speed, or the like to enable detecting abnormality due to, for example, suspension of water supply, or the like to enable emergency stop of the drums.

ADVANTAGE OF THE INVENTION

The liquid splash and scatter preventing equipment according to the invention is provided above a liquid surface layer to prevent liquid splash and scatter generated due to bump in a concentration section and further a liquid adhering to an upper surface of the equipment does not grow to become dry powder but remains in a liquid state, so that a continuous and stable operation is made possible over a long term.

What is claimed is:
1. A double drum type drum dryer comprising:
   two liquid drying drums in a chamber located adjacent one another to form a liquid concentration section therebetween, said liquid concentration section configured to maintain liquid fed into said liquid concentration section in contact with both of the two liquid drying drums;
   a liquid feed port configured to feed a liquid into the liquid concentration section; and
   a liquid splash and scatter preventing equipment having a cooling function provided in a location above a portion of the liquid concentration section.

2. The drum dryer according to claim 1, wherein the liquid splash and scatter preventing equipment having the cooling function comprises therein a cavity for feeding of a cooling liquid refrigerant.

3. The drum dryer according to claim 1, wherein the liquid splash and scatter preventing equipment having the cooling function is made of a hollow metal passage for feeding of cooling water.

4. The drum dryer according to claim 3, wherein the cooling water maintains a surface temperature of the hollow metal passage at 13° C. to 40° C.

5. The drum dryer according to claim 4, wherein the cooling water maintains a surface temperature of the hollow metal passage at 18° C. to 38° C.

6. The drum dryer according to claim 3, wherein the cooling water maintains a surface temperature of the hollow metal passage at no more than 5° C. lower than an evaporation temperature of a liquid to be dried.

7. The drum dryer according to claim 3, wherein the cooling water maintains a surface temperature of the hollow metal passage at no more than 22° C. higher than an evaporation temperature of a liquid to be dried.

8. The drum dryer according to claim 3, wherein the hollow metal passage has an axis parallel to the axis of rotation of the drums.

9. A double drum type drum dryer comprising:
a liquid splash and scatter preventing equipment having a cooling function provided in a location above a portion of a liquid concentration section between drums, the liquid splash and scatter preventing equipment including a hollow metal passage for feeding of cooling water; and
a cooling water feed system configured to supply cooling water to the hollow metal passage such that the cooling water maintains a surface temperature of the hollow metal passage at 13° C. to 40° C.

10. The drum dryer according to claim 9, wherein the cooling water maintains a surface temperature of the hollow metal passage at 18° C. to 38° C.

11. The drum dryer according to claim 9, wherein the cooling water maintains a surface temperature of the hollow metal passage at no more than 5° C. lower than an evaporation temperature of a liquid to be dried.

12. The drum dryer according to claim 9, wherein the cooling water maintains a surface temperature of the hollow metal passage at no more than 22° C. higher than an evaporation temperature of a liquid to be dried.

13. The drum dryer according to claim 9, wherein the hollow metal passage has an axis parallel to the axis of rotation of the drums.

14. A double drum type drum dryer comprising:
a liquid splash and scatter preventing equipment having a cooling function provided in a location above a portion of a liquid concentration section between drums, the liquid splash and scatter preventing equipment including a hollow metal passage for feeding of cooling water; and
a cooling water feed system configured to supply cooling water to the hollow metal passage such that the cooling water maintains a surface temperature of the hollow metal passage at no more than 5° C. lower than an evaporation temperature of a liquid to be dried.

15. The drum dryer according to claim 14, wherein the cooling water maintains a surface temperature of the hollow metal passage at 18° C. to 38° C.

16. The drum dryer according to claim 15, wherein the cooling water maintains a surface temperature of the hollow metal passage at no more than 22° C. higher than an evaporation temperature of a liquid to be dried.

17. The drum dryer according to claim 14, wherein the hollow metal passage has an axis parallel to the axis of rotation of the drums.

* * * * *